M. WILDERMAN.
MANUFACTURE OF RUBBER.
APPLICATION FILED MAY 15, 1906.
908,925.
Patented Jan. 5, 1909.
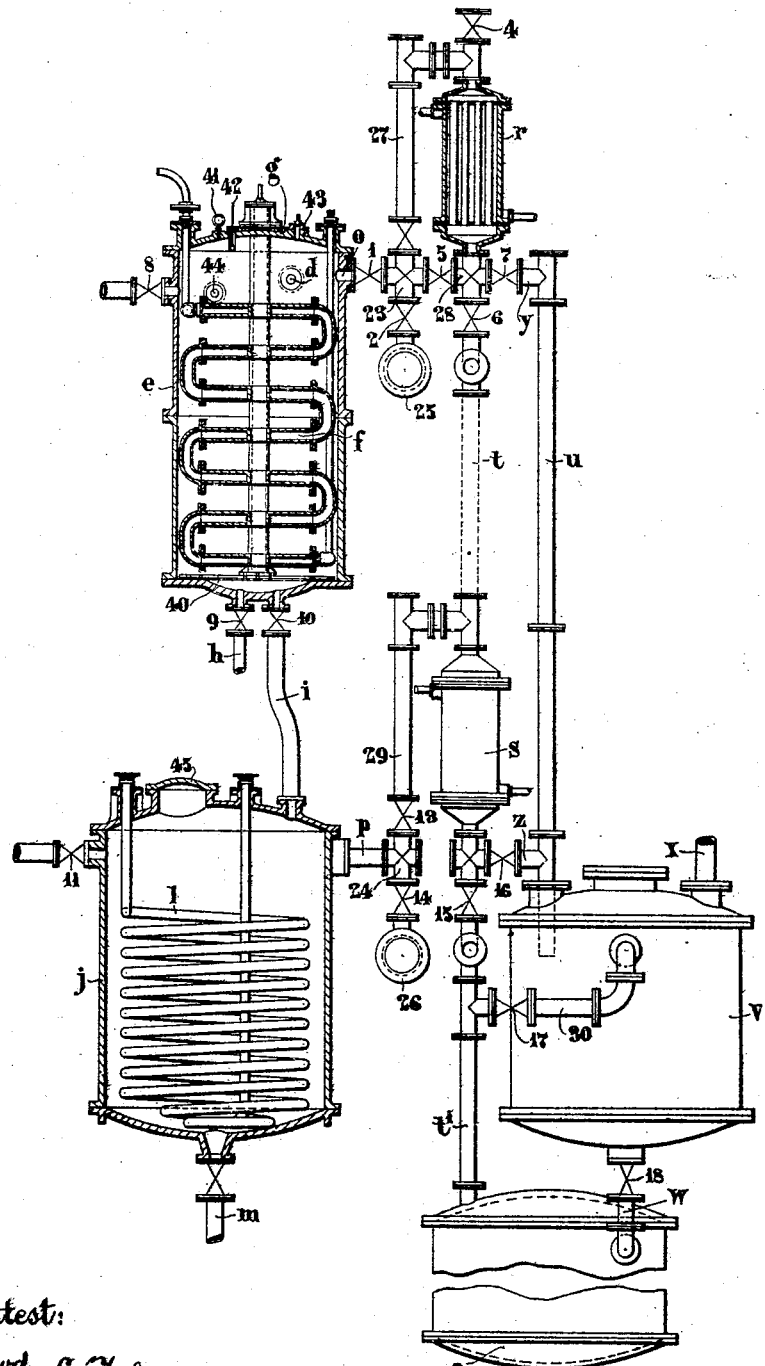
Attest:
Ew'd L. Folson
Bent M. Stahl
Inventor:
Meyer Wilderman,
By Spear Middleton Donaldson Spear Att'ys

UNITED STATES PATENT OFFICE.

MEYER WILDERMAN, OF LONDON, ENGLAND.

MANUFACTURE OF RUBBER.

No. 908,925.  Specification of Letters Patent.  Patented Jan. 5, 1909.

Application filed May 15, 1906. Serial No. 316,967.

*To all whom it may concern:*

Be it known that I, MEYER WILDERMAN, a subject of the Czar of Russia, and residing at 10 Elers road, Lammas Park, South Ealing, London, W., England, chemist, have invented certain new and useful Improvements in and Relating to the Manufacture of Rubber, of which the following is a specification.

My invention relates to the manufacture of rubber and to the improvement of the quality of rubber by means of solvents used in such a manner that the loss of solvent is so small that the treatment can be carried out on a commercial scale.

When two to five grams of raw rubber which has been washed and dried is heated for a considerable time with 300 c. c. of chloroform over the water bath, the mechanical impurities and certain oxidation products of rubber remain undissolved while the rubber and resins go into solution. If now alcohol be added slowly until the liquid becomes and remains turbid on standing for some time a considerable quantity of flaky precipitate is obtained. This precipitate consists of $\alpha$ rubber. If the mixture be now filtered and 500 c. c. of alcohol be added to the filtrate, a second precipitate is obtained which has been called $\beta$ rubber. The mass obtained by evaporating the chloroform and alcohol from this second filtrate consists of $\gamma$ rubber and resins and by boiling with absolute alcohol, the resins to a great extent go into solution while $\gamma$ rubber remains undissolved.

Of the constituents of raw rubber treated as above described the $\alpha$ rubber is the most valuable part, $\beta$ rubber is considerably weaker than $\alpha$, while $\gamma$ is detrimental to the quality of the rubber on account of its easy oxidation. The resins contained in raw rubber are not polyporous at all.

The object of my invention is to separate rubber which has been freed from mechanical impurities by washing, into its constituent parts and to obtain the more valuable constituents, $\alpha$ or $\alpha$ and $\beta$ rubber separated from the detrimental parts, the $\gamma$ rubber and resins or $\beta$ and $\gamma$ rubber and resins which include the sticky constiruents of the raw rubber.

On account of the high cost of the solvents used in this separation and the fact that it is impossible to separate the solvents used without considerable loss, the separation of the constituents of washed and dried rubber in the above manner has been heretofore impracticable commercially, since the cost of the solvents is considerably greater than that of the rubber itself.

My invention consists in the first instance, in employing a mixture of solvents for the separation by solution of one or more of the detrimental and less valuable constituents of raw rubber which has been washed and dried from the valuable constituents, the dissolved inferior parts of the rubber being recovered without separation so that a cyclic process is obtained.

The invention further consists in a cyclic process for separating the more valuable parts by the use of a mixture of two solvents, one of which is a solvent of all the constituents of the rubber while the other is a solvent of resins or resins and a small part of the inferior constituents of rubber when not inclosed in the less soluble constituents, the solutions being so chosen that, under given conditions as to temperature pressure and the kind of rubber used, the mixture is capable of dissolving the resins and more or less of the inferior constituents of the rubber but not the better constituents.

The mixture of solvents is recovered without separation and can be used for successive quantities of rubber, whereby the loss and expense required in separating the solvents is completely avoided.

The invention further consists in the improvements in the separation and purification of rubber hereinafter described.

The solvents which I prefer to use are mixtures of benzol, carbon tetrachlorid, or chloroform with methyl or ethyl alcohol, the proportions of the mixture of solvents being chosen having regard to the class of rubber treated and the kind of separation required.

Referring to the accompanying drawings which illustrate a form of apparatus suitable for carrying out my improved process, I provide a stock tank, $a$, in which the solvent to be used is contained, this tank is provided with an outlet pipe, $b$, leading to a force pump and provided with a cock, 19, the force pump is connected to the inlet, $d$, of a vessel, $e$, in which the rubber is treated in pans supported by frames resting on the coil, $f$, adapted to be lifted out of the vessel, $e$, together with the cover, $g$. The coils are provided with an inlet and outlet for hot water or other heating or cooling fluid supplied in any suitable manner. At the lower end of the vessel, $e$, are a gauze screen, 40, and two outlet pipes, $h$, $i$, the outlet, $i$, leads to a second or draining vessel, $j$. This draining vessel, $j$, is provided with a heating coil, $l$, and an outlet pipe, $m$, at the bottom, and with a manhole, 45. At the upper ends of the two vessels, $e$, $j$, vapor pipes, $o$, $p$, are provided leading to condensers, $r$, $s$, which are connected by a pipe, $t$, with the stock tank, $a$. A pipe, $u$, is provided leading to an intermediate tank, $v$, this tank being connected to the stock tank, $a$, through a pipe, $w$, and to a vacuum pump by a pipe, $x$, the outlet from this vacuum pump leading back to the condensers, $r$, $s$. The pipe, $u$, is connected by cross pipes, $y$, $z$, to the pipes immediately below the condensers, $r$, $s$, respectively. Branch pipes, 23, 24, are also provided leading from the pipes, $o$, $p$, respectively to the general mains, 25, 26, which are connected to the stock tank, $a$, through a second vacuum pump and a third condenser. The pipe, $o$, is connected to the top of the condenser, $r$, by a pipe, 27, and to the bottom of the condenser, $r$, by a pipe 28, while the pipe, $p$, is connected to the top of the condenser, $s$, by a pipe, 29. A pipe, 30, is provided leading from the pipe, $t$, below the condenser, $s$, to the upper part of the intermediate tank, $v$. A single stock tank, $a$, and force pump with a single pair of general mains, 25, 26, are conveniently provided for a plurality of sets each comprising an absorption tank, $e$, draining tank, $j$, condensers, $r$, $s$, intermediate tank, $v$, and vacuum pump connected thereto, with their respective connections. The vessel, $e$, is provided with pressure gage, 41, thermometer, 42, safety valves, 43, and suitable overflow pipes, 44, and the various connecting pipes are provided with cocks for use as hereinafter described.

In carrying out my invention according to the cyclic process in the apparatus above described, the rubber to be treated, which is either the dried raw rubber cut into small pieces, or when necessary, washed and freed from mechanical impurities and albuminous matter and then dried in sheets, is placed in the pans with suitable provision for drainage into frame containing several shelves and serving to support the pans. These frames are placed on the coil, $f$, and the coil placed in the vessel, $e$, which is then tightly closed. The cocks, 19, and the cock in the inlet, $d$, are now opened and the solvent is pumped by the force pump into the absorption vessel, $e$.

The solvent consists of a mixture of two or more solvents, one of which is capable by itself of dissolving the whole of the constituents of rubber, i. e., $\alpha$ $\beta$ $\gamma$ rubber and resins while the other is only a solvent of resins and putrid matter or of resins together with a small part of the inferior rubber, when the same are not inclosed in $\alpha$ and $\beta$ rubber, the two components being taken in such proportions that the mixture is capable of penetrating throughout the rubber mass leaving the better part of it as a soft solid mass.

Suitable solvents for the purpose are chloroform benzol, $CCl_4$, or the like, which are solvents for the whole of the rubber, these being mixed with methyl alcohol, ethyl alcohol and the like which by themselves are not solvents of all the constituents of rubber but are only solvents for the resins or the resins and a little of the inferior rubber, when not inclosed in $\alpha$ or $\beta$ rubber. The mixture of solvents is so chosen that at the conditions of temperature and pressure at which the action on the rubber is to take place either $\alpha$ and $\beta$ rubbers or $\alpha$ rubber remain undissolved while the resins and inferior parts of the rubber, i. e., $\gamma$ rubber or $\beta$ and $\gamma$ rubbers go into solution. The total amount of solvent is taken so large that the quantity remaining included in the rubber after the whole of the rubber is thoroughly penetrated by the same forms only a fraction of the whole.

A glass indicating gage with two cocks is preferably provided in connection with the absorption vessel, $e$, in order to show the level of the solvent in that vessel; the solvent is pumped in by the force pump to keep up to the required level, i. e., just above the highest pan of rubber, the cock, 8, being at this time closed, as is also the cock in the pipe, 44.

Steam or water of a required temperature is now introduced through the coil, $f$, to heat up the mass and solvent in the absorption vessel to the desired temperature and the solvent is allowed to act on the rubber at this temperature either at atmospheric pressure or at increased pressure. During this first stage of the process the vessel, $e$, is connected to the condenser, $r$, the cocks, 1, 5 and 4 being open, and the cocks, 3, 7, 2 and 6 being closed.

After the solvent has acted for the desired time, generally about twelve hours, the cock, 10, is opened and the solvent drained off into the draining vessel, $j$. The manner in which this is done will depend upon the kind of separation required and upon the nature of the rubber and the solvent used. I may drain off the solvent from the solid while the vessel, $e$, is still warm, so that more of the inferior rubbers go into solution or I may cool the contents of the vessel, $e$, first, and in this case less of the lower quality rubbers will go into solution; with a given mixture of the solvent and a given rubber the cooling may be required also in order that the solid may become first less soft so as to allow better drainage, or to allow a better collection of the rubber. So also I may dissolve more of the rubber at a higher temperature of pressure and separate again at a lower temperature and pressure the valuable parts of the rubber. The vessel ($e$) may be cooled before draining by introducing cold water into the coils, f. The kind of separation will of course depend on the nature of the rubber used and the purpose for which the rubber obtained is intended to be used and by regulating the conditions of the process and the temperature at which the draining takes place, I can conveniently obtain any kind of separation desired. In the case of inferior rubbers I may repeat the process in the vessel, e, with a fresh quantity of solvent, so as to remove the resins and inferior rubbers still remaining with the solvent in the rubber, the time allowed being rather less than in the first treatment. In treating the better qualities of rubbers one treatment with a sufficient quantity of the solvent quite suffices to reduce the amount of resin and inferior rubber still remaining with the solvent or the rubber to the required practical minimum. The better parts of the rubber are left after drainage in the pans in the vessel, e, but there is a considerable quantity of solvent still remaining in the solid rubber and the next part of my improved process is directed to the recovery of this solvent and also the solvent which has been drained away with the inferior rubber and resins into vessel, j. For this purpose I first evaporate the solvents at atmospheric pressure, heat being supplied to both vessels, e and j, by heating the coils, f and l, respectively. In this part of the process the cocks, 1, 3 and 6, will be open 2, 4, 5 and 7 closed, and also for the draining vessel the cocks, 13 and 15, will be open and the cocks 14, 16 and 17 will be closed. It will therefore be seen that during this stage of the process the solvent is evaporated from both vessels, a and j, and passes through the condensers to a main pipe and down the pipe, t, to the stock tank, a.

It is necessary in order to completely recover the solvent to evaporate under diminished pressure and for this purpose the various connections are changed so that the cocks, 2, 6, 5 and 4 are closed while the cocks 1, 3 and 7 are opened, similar connections being made for the lower condenser. The vapor from both vessels therefore will pass through the condensers into the pipe, u, and in the intermediate tank, v.

The vacuum pump in connection with the pipe, x, is operated to create a vacuum in both vessels, the vapor passing through the vacuum pump being returned through the condensers, r, s, above described. From the intermediate tank the solvent can pass to the stock tank, a, by opening the cock, 18.

It is found that after a certain time as much solvent is evaporated from the intermediate tank, v, as is drawn off from the vessels, e and j. When this stage is reached I evaporate the remaining solvent under vacuum, the cocks 1, 3 and 14 being open.

The solvent thus passes as vapor to the general mains, 23 and 26 and from them through the third condenser to the stock tank, a, the second vacuum pump above referred to being used for this purpose, this vacuum pump and condenser being common to a plurality of sets of vessels, e, j. It will be seen that in the above process the whole of the solvent is removed from the rubber from both the chambers, e and j, and is led back ultimately to the stock tank, a, so that the process is cyclic. The vessels, e or j, or both may be now opened and the contents removed and a fresh quantity of rubber placed in the vessel, a, and this may be effected without stopping the operations of other units in the installation.

By means of the above described process, I obtain the more valuable constituents of the raw rubber, i. e., α rubber or α and β rubbers of which the α rubber is the more valuable, practically separated from the γ rubber and the resins, or β and γ rubbers and the resins; or the rubber separated from the resins and putrid matter only.

It will be seen that by a suitable choice of the proportions of the solvent used at the given temperature and pressure I can obtain α or α and β or α, β and γ rubbers or any mixture of them desired, while the temperature at which the vessel, e, is drained provides a further means for regulating the qualities of the rubber separated in the two vessels.

In the above description I have considered only the separation of the rubber into two parts the whole of the rubber being recovered from both parts, the whole of the solvent also being recovered and in that case the mixture of solvents used is of such proportions that although it is capable of penetrating throughout the whole mass of the rubber it is not a solvent for the whole of the rubber but only for the resins and a portion of the inferior constituents of the rubber.

In the above description I have for convenience described the invention as carried out in the apparatus illustrated and it will be found that this apparatus is very convenient. It will however be seen that other forms of apparatus may be used without departing from the process which forms the essential part of my invention.

What I have referred to above as "raw" rubber includes all forms of rubber consisting of a mixture of α β γ and resin components, whether such mixture is the natural product or obtained by recovery or separation from partially vulcanized stock or otherwise.

Having thus described my invention what I claim as new and desire to secure by Letters Patent is:—

1. A process for separating rubber; consisting in freeing the rubber from mechanical and volatile impurities and washing and drying under vacuum; and treating with a mixture of solvents one of which when alone is a solvent of all the constituents of the rubber while another is only a solvent of resins; as set forth.

2. A process for separating rubber into its more valuable part and less valuable part the latter including the resins, consisting in washing the rubber, drying under vacuum and then treating with a mixture of solvent of which one when alone is a solvent of all the constituents of the rubber while another is only a solvent of resins, as set forth.

3. A process for separating rubber, consisting in treating rubber freed from mechanical and volatile impurities with a mixture of solvents, of which one when alone is a solvent of all the constituents of the rubber while another is only a solvent of resins, the mixture being capable of penetrating the whole of the rubber but only a solvent for a part; and in recovering the mixed solvents without separation.

4. A process for separating rubber; consisting in treating rubber, with a mixture of solvents, of which one when alone is a solvent of all the constituents of the rubber, while another when alone is only a solvent of resins, the mixture being capable of penetrating the whole of the rubber but only a solvent for a part; running off the mixture of solvents containing the inferior constituents of the rubber including the resins from the valuable part of the rubber; and evaporating and collecting the mixed solvents from the whole of the rubber and resins.

5. A process for separating rubber consisting in treating rubber with a mixture of solvents, of which one when alone is a solvent of all the constituents of the rubber, while another when alone is only a solvent of resins the mixture being capable of penetrating the whole of the rubber but only a solvent for a part; running off the mixture of solvents containing the inferior constituents of the rubber; evaporating the mixed solvents from the whole of the rubber and resins, first at atmospheric pressure and then under vacuum; and recovering the mixed solvents without separation from the whole of the rubber and resins.

6. A process for separating rubber; consisting in freeing the rubber from mechanical and volatile impurities by washing; drying under vacuum; treating with a mixture of solvents, of which one when alone is a solvent of all the constituents of the rubber while another when alone is only a solvent of resins; running off the mixed solvents; evaporating the solvent from the whole of the rubber and resins and collecting the mixed solvents.

7. A process for separating rubber; consisting in treating rubber freed from mechanical and volatile impurities with a mixture of solvents, of which one when alone is a solvent of all the constituents of the rubber, while another when alone is only a solvent of resins; running off the solvent containing the resins and a portion of the inferior constituents of the rubber from the better part of the rubber; evaporating the solvent from the whole of the rubber and resins, first at atmospheric pressure and then under vacuum, and collecting the mixed solvents from the whole of the rubber and resins.

In testimony whereof I have signed my name to this specification in the presence of two subscribing witnesses.

MEYER WILDERMAN.

Witnesses:
ALBERT E. PARKER,
FRANCIS J. BIGNELL.